United States Patent [19]

Hudson

[11] Patent Number: 5,058,857

[45] Date of Patent: Oct. 22, 1991

[54] SOLENOID OPERATED VALVE ASSEMBLY

[76] Inventor: Mark Hudson, Rte. 4, Box 154, Theodore, Ala. 36582

[21] Appl. No.: 484,698

[22] Filed: Feb. 22, 1990

[51] Int. Cl.[5] .......... F16K 31/124

[52] U.S. Cl. .......... 251/30.05; 91/459; 91/466; 123/90.11; 123/90.12

[58] Field of Search .......... 123/90.11, 90.12, 90.13; 281/30.05; 91/459, 466

[56] References Cited

U.S. PATENT DOCUMENTS

| | | | |
|---|---|---|---|
| 3,402,913 | 9/1968 | Payne et al. . | |
| 3,727,595 | 4/1973 | Links . | |
| 3,738,337 | 6/1973 | Massie | 123/90.12 |
| 3,926,159 | 12/1975 | Michelson et al. . | |
| 4,200,067 | 4/1980 | Trenne . | |
| 4,664,070 | 5/1987 | Meistrick et al. . | |
| 4,716,863 | 1/1988 | Pruzan . | |
| 4,724,801 | 2/1988 | O'Neill . | |
| 4,974,495 | 12/1990 | Richeson | 281/30.05 X |

*Primary Examiner*—Gerald A. Michalsky

*Attorney, Agent, or Firm*—Gifford, Groh, Sprinkle, Patmore and Anderson

[57] ABSTRACT

A valve assembly for an energy transfer unit comprises a source of hydraulic fluid, a reciprocating valve member reciprocable from an open position to a closed position, a slidable sleeve assembly whereby the hydraulic fluid is selectively allowed to force the valve member into the open position or into the closed position, and a solenoid, for selectively operating the slidable valve assembly to provide for the open or closed position. The slidable sleeve assembly comprises a first sleeve half portion and a second half portion, each sleeve half portion having at least one fluid-passing aperture defined therein. Two chambers are provided, an upper chamber and a lower chamber, for selectively receiving pressurized fluid therein. Whether the valve member is in the closed position or in its open position depends upon whether or not fluid is entering or exiting the respective upper chamber and lower chamber.

1 Claim, 1 Drawing Sheet

SOLENOID OPERATED VALVE ASSEMBLY

BACKGROUND OF THE INVENTION

I. Field of the Invention

The present invention relates generally to hydraulic valve assemblies for use in energy transfer units such as automotive, truck and airplane engines. More particularly, the present invention relates to a valve assembly for an energy transfer unit where the valve assembly is operated by a solenoid, the solenoid controlling a sleeve assembly to selectively allow the entrance and exit of hydraulic fluid to affect the raising or lowering of a valve member into either of a closed or open positon respectively.

II. Description of the Relevant Art

Improvements of valving systems for energy transfer units, such units including compressors, pumps and internal combustion engines, are continually being sought. Proper and efficient valving is critical to the efficient operation of an energy transfer unit in that efficiently operated valves are fully operated with only a minimum of energy requirement.

Several approaches have been taken toward improving the efficiency of energy transfer unit valve assemblies. Such advancements include the rotary-valve engine, the two-port poppet-valve engine, and the reed-valve engine. These modifications, while generally making significant improvements in valving, have only proven valuable to a limited extent because to operate a valve system mechanically, the engineer is generally limited by the number of valves possibly situated per cylinder, the necessary position of the valve for operation by one or two cam shafts, and the complicating factor of trying to operate all of the valves from a cam running in a single plane.

In a partial answer to the requirement for maximum flexibility of construction, various hydraulic valve lifting assemblies have been devised and applied. While these systems have more or less resolved some of the problems related to strictly mechanically-lifted valves, they tend to be complex and are not able to respond quickly to changing engine requirements and conditions. This is so because known hydraulic valve assemblies are still generally restricted by mechanical operation, either directly or indirectly, as they relate to the performance and output of the engine.

Accordingly, the prior approaches directed at solving the problems of providing a valve assembly that can be operated in concert with, yet independent of, the engine to maximize performance and minimize inefficiency have failed to eliminate the inconvenience and any effectiveness of known valve systems.

SUMMARY OF THE PRESENT INVENTION

The present invention provides a valve assembly for an energy transfer unit which overcomes the known problems of present valve assemblies.

The valve assembly for an energy transfer unit according to the present invention comprises a source of hydraulic fluid, a reciprocating valve member reciprocable from an open position to a closed position, a slidable sleeve assembly whereby hydraulic fluid is selectively allowed to force the valve member into the open position or into the closed position, and a solenoid for selectively operating the slidable sleeve assembly to provide for the open and closed position.

The slidable sleeve assembly comprises a first sleeve half portion and a second sleeve half portion, each sleeve half portion having at least one fluid-passing aperture defined therein. Two chambers are provided, an upper chamber and a lower chamber, for receiving a pressurized fluid. The closed or open position of the valve assembly is determined by whether or not fluid is being allowed to enter into one of the chambers or is being allowed to exit one of the chambers. The slidable sleeve assembly controls the flow of the hydraulic fluid. At any given time, when fluid is being allowed to enter one chamber fluid it is exiting the Other chamber, and vice versa, thereby providing hydraulic pressure which forces the valve assembly into one of the open or closed positions.

According to one embodiment of the present invention, a valve is provided having a valve stem. Intermediate between the two chambers and peripherally situated around the valve stem is a seal. The seal is provided to prevent fluid from passing from the upper chamber into the lower chamber.

By operation of the slidable sleeve assembly, when the sleeve assembly is in a raised position, fluid is prohibited from entering the upper chamber but is allowed to pass therefrom while fluid is permitted to enter the lower chamber but is prohibited from passing therefrom. Hydraulic pressure acts upon the seal, thus forcing the valve member into its closed position. When the sleeve assembly is in a lower position, fluid is permitted to enter the upper chamber but is not allowed to pass therefrom while the fluid is prohibited from entering into the lower chamber but is allowed to pass therefrom. Now hydraulic pressure acts upon the seal from the opposite direction, and the valve member is opened. In this situation, the sleeve assembly in conjunction with the fluid dictate that the valve member be set into either its open or closed position.

In another embodiment, a valve is remotely operated by interaction with a rocker arm. A portion of the rocker arm is situated between two valve control pistons, an upper valve control piston and a lower valve control pistion. The upper valve control piston is fluidly interrelated with the upper chamber, and the lower valve control piston is fluidly interrelated with the lower chamber. Accordingly, and similarly to the operation of the first embodiment, when fluid is allowed to enter into the upper chamber and exits the lower chamber, the upper valve control piston presses down upon the rocker arm, which in turn presses down upon the valve thereby forcing the valve into its open position. Conversely, when fluid is allowed to enter into the lower chamber and is allowed to exit the upper chamber, the lower valve control piston is hydraulically forced up against the rocker arm, thereby causing the valve to return to its closed position.

In either embodiment, the sleeve assembly is controlled by a solenoid. Both embodiments of the present invention rely on the solenoid to move the sleeve assembly up and down in short strokes. The present design allows on-board computers and sensors commonly in place on today's engines to allow a computer-driven solenoid to vary valve timing, in response to changing demands on the engine while running. This construction also produces less friction, provides less rotating and reciprocating mass, and provides a method of operation which is lighter than a cam shaft or mechanical valve train. Overall, the present invention reduces engine weight.

The timing of the valve operation can be easily varied by a computer. By slightly modifying the software used today to control ignition timing, the valve timing may be controlled concurrently. Lift and duration may be varied according to engine loads and road and operating conditions. This system allows the engine to run under ideal timing conditions at all speeds, loads, and throttle positions, resulting in greatly improved efficiency, better power output, improved economy and reduced emissions.

To feed the fluid into the chambers, oil pressure would be required, although the oil pump required for this system would produce less friction than the valve trains commonly provided in today's engine. The oil pump conventionally provided may be used and the necessary hydraulic fluid siphoned therefrom, or an auxillary pump may be added.

Of the two embodiments, the embodiment utilizing the valve without the rocker arm is perhaps the simplest and has the advantage of flowing cooling oil through the valve guide and over the valve stem. This system, however, is relatively slow compared to the other embodiment, and would preferably be used only in slow turning engines such as large diesel engines and possibly in engines for light aircraft.

The alternate embodiment, that engaging a rocker arm driven by a valve assembly, provides leverage of a rocker arm to move the valves faster while requiring only a minimum movement of oil. This assembly greatly speeds up the operation of the valve and allows application of the valve of the present invention in automotive engines.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which.

DETAILED DESCRIPTION OF THE PREFERRED EMBODIMENTS OF THE PRESENT INVENTION

Figure 1:
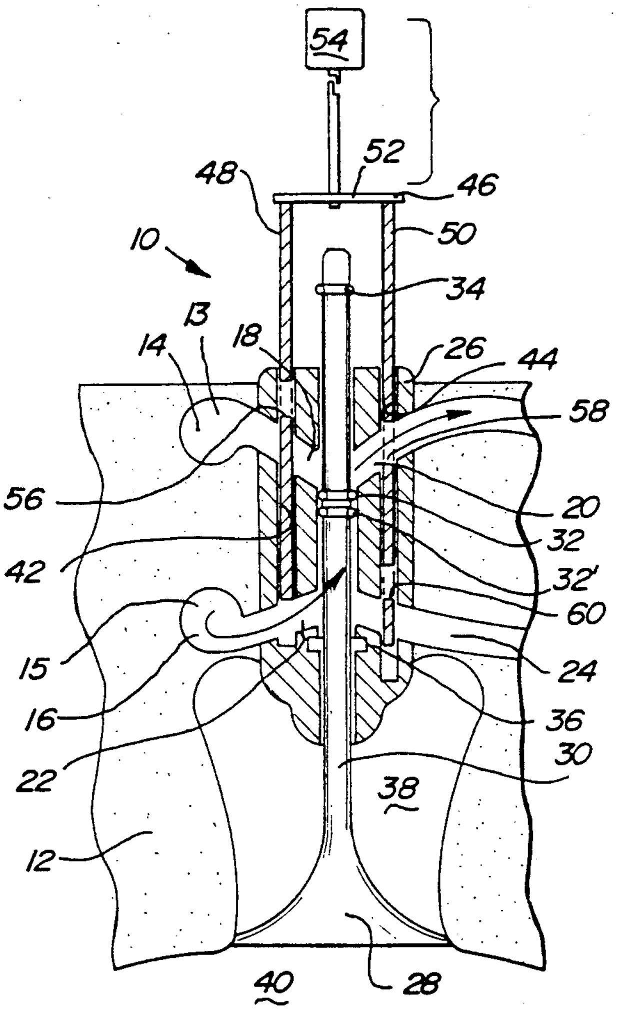
FIG. 1 is a cross-sectional view of a first embodiment of the valve assembly of the present invention.

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, a valve assembly for an energy transfer unit is shown and is generally indicated as 10. The valve assembly 10 is substantially positioned within a head casting 12. Within the head casting 12 are defined an upper chamber 14 and a lower chamber 16. The upper chamber 14 comprises an upper chamber input port 13 that fluidly interconnects an upper chamber input line 18 which in turn fluidly interconnects an upper chamber output line 20. The lower chamber 16 comprises a lower chamber input port 15 that fluidly interconnects a lower chamber input line 22 and a lower chamber output line 24. The chambers 14, 16 are defined partially in the head casting 12 and partially in a valve guide 26.

Centrally positioned within the valve guide 26 is a valve 28. The valve 28 includes a valve stem 30. Peripherally defined about the mid-point of the valve stem 30 are a pair of fluid seals 32, 32'. Of course, more or less seals 32, 32' may be employed, and the seals may themselves have alternate shapes than the ring-type seals shown.

At the uppermost end of the valve stem 30 is peripherally provided an open valve position stop ring 34. The stop ring 34 prevents the valve 28 from dropping too far through the valve guide 26 when the valve 28 is set into its open position. An additional seal 36 is provided at the lower portion of the valve guide 26.

Beneath the valve guide 26 and defined within the head 12 is an intake-exhaust port 38. Situated beneath the port 38, the valve 28, and the head casting 12 is an area generally defined as the combustion chamber 40.

Defined within the valve guide 26 are a pair of slot half portions 42, 44. The slot half portions 42, 44 slidingly accomodate the a slidable sleeve assembly 46. The sleeve assembly 46 comprises a first sleeve half portion 48 and a second sleeve half portion 50. The first sleeve half portion 48 slides within the first slot half portion 42, while the second sleeve half portion 50 slides within the second slot half portion 44. Interconnecting the slidable sleeve half portions 48, 50 is a bar 52. The bar 52 is interconnected with a solenoid 54. The slot half portions 42, 44 may define a groove coaxially ringed about the valve stem 30, or may be a pair of non-joined, semicircular slots.

Defined within the first slidable sleeve half portion 48 is an upper chamber inlet aperture 56. Defined within the second slidable sleeve half portion 50 is an upper chamber outlet port 58. Also defined within the second slidable sleeve half portion 50 is a lower chamber outlet port 60.

In operation, and as illustrated with the valve 28 being in a closed position, the fluid normally pumped into the chamber input port 13 is prohibited from entering into the inlet line 18. However, the fluid thereabout is allowed to exit through the port 58. The fluid exits to return to the crankcase.

While the first sleeve half portion 48 is in this elevated position, the fluid is allowed to enter into the lower chamber input port 15 and into the inlet line 22 whereby it presses against the lower seal 32' hydraulically, thereby setting the valve 28 into the closed position. Simultaneously, the second sleeve 50 prevents fluid from exiting to the outlet line 24 and back to the crankcase.

When the solenoid 54 operates the sleeve assembly 46 to be placed into its lowered postion, the fluid is allowed into the upper chamber input line 18 through port 56, but is prevented from exhausting through the output line 20. According to this action, the valve 28 would be forced into its open or lowered position by hydraulic pressure against the upper seal 32.

So as not to interfere with the exerted hydraulic pressure, the fluid is prevented from leaving the lower chamber input port 15 and entering into the inlet line 22 because the first sleeve half portion 48 shall have been dropped down to block the passage.

The embodiment illustrated in FIG. 1 is primarily suited, as noted above, for slower engines such as diesel or aircraft applications.

Figure 2:
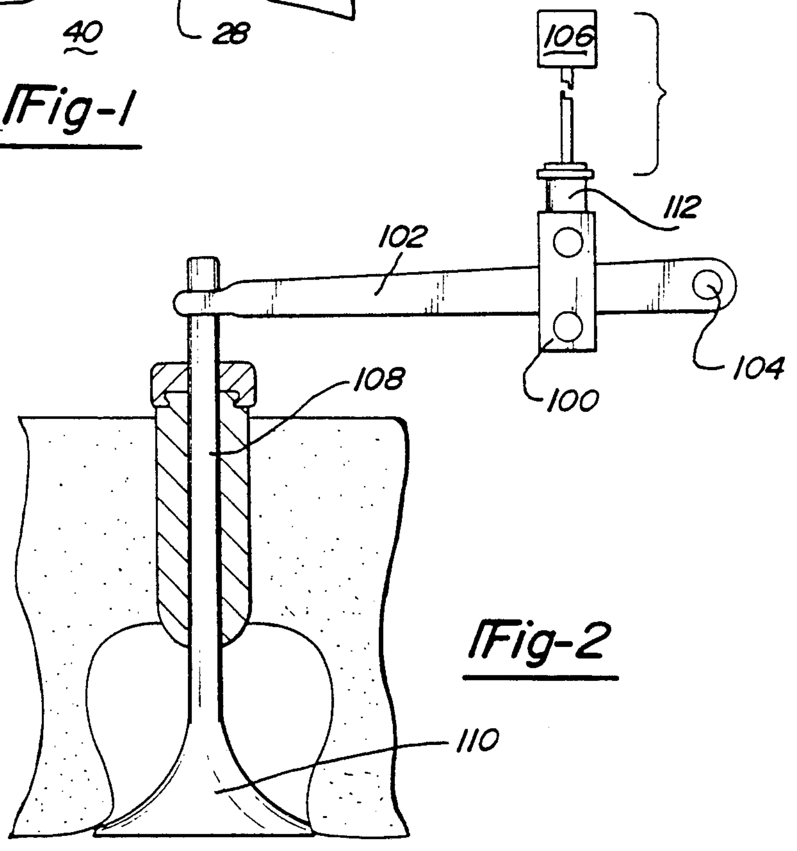
FIG. 2 is a cross-sectional view of an alternate embodiment of the present invention illustrating the valve, the valve guide, the rocker arm, and the valve assembly.

With reference now to FIG. 2, an embodiment which is useful for applications in faster moving engines, such as those found in automobiles, is illustrated. According to this embodiment, a valve assembly 100 operates a rocker arm 102 to go in an up or down position. The rocker arm 102 pivots upon pivot point 104. The upward or downward motion of the rocker arm 102 is essentially caused by interaction of a solenoid 106 with the valve assembly 100 as will be described below with respect to FIG. 3.

When the rocker arm 102 is in its elevated position it engages with a valve stem 108 of a valve 110, thereby closing the valve 110. Conversely, when the rocker arm 102 is in its lowered position, the valve 110 is placed in its open position.

As illustrated in FIG. 2, there is a sleeve assembly 112 shown at the uppermost portion of the valve assembly 100. The sleeve assembly 112 here is shown as being a tubular assembly, whereby a first sleeve portion and a second sleeve portion are embodied in the single tube assembly.

Figure 3:
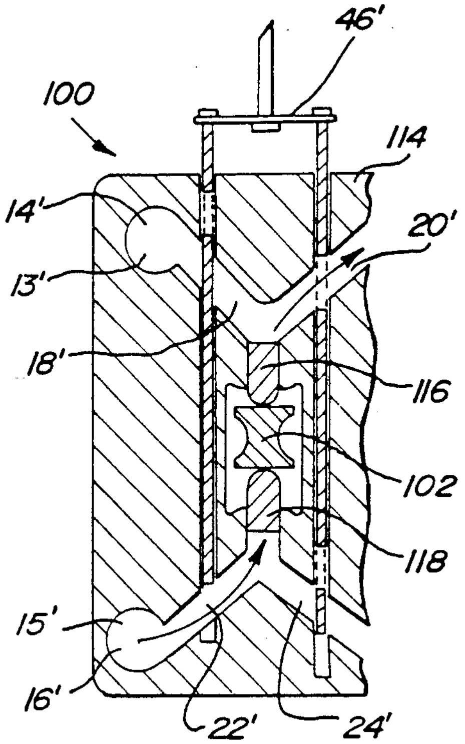
FIG. 3 is a detailed cutaway view of the embodiment of the valve assembly of FIG. 2.

With reference now to FIG. 3, a detailed, cross-sectional view of the valve assembly 100 is illustrated. The valve assembly includes a valve control body unit 114. The construction and operation of the embodiment illustrated with respect to this figure is essentially the same as that described above with respect to FIG. 1, excepting that instead of a valve stem positioned approximately in the center of the assembly, there is provided an upper valve control piston 116 and a lower control valve piston 118. The rocker arm 102 may be seen situated between the upper valve piston 116 and the lower valve piston 118. As illustrated in FIG. 3, the rocker arm 102 is in its elevated, or closed position, in that fluid from the lower chamber input port 15' of the lower chamber 16' has entered the inlet line 22' to thereby lift, by hydraulic pressure, the lower valve control piston 118 which, in turn, has elevated the rocker arm 102. As illustrated in FIG. 2, the rocker arm 102 has elevated the valve 110 into its closed position.

Also as illustrated in FIG. 3, the sleeve assembly 46' has operated to close the inlet line 18' thereby preventing fluid from entering thereinto from the upper chamber input port 13' of the upper chamber 14'. However, the outlet line 20' has been allowed to be open, whereby fluid is allowed to escape and return to the crankcase.

For bringing fluid into the upper or lower chamber of either embodiment, a takeoff may be applied from the oil pump of a conventional engine as is well known, or a separate oil pump may be fitted to supply the oil. In any event, escaping oil returns to the crankcase for recirculation through the engine. Of course, the hydraulic system may be isolated for application only to the valve assembly 10.

Having described my invention, however, many modifications thereto will become apparent to those skilled in the art to which it pertains without deviation from the spirit of the invention as defined by the scope of the appended claims.

I claim:

1. A valve assembly mountable within the head of an internal combustion device, said assembly comprising:

a valve guide having a valve guide bore, an upper pressurized fluid input line, a lower pressurized fluid input line, an upper output line, and a lower output line;

a valve member reciprocally fitted in said bore; a first sleeve slot intersecting said upper and lower input lines;

a second sleeve slot intersecting said upper and lower output line;

a first sleeve half portion slidably disposed in said first sleeve slot, said first sleeve in a first position blocking a fluid flow in said upper input line and allowing a fluid flow in said lower input line, said first sleeve in a second position blocking a fluid flow in said lower input line and allowing a fluid flow in said upper input line;

a second sleeve half portion slidably disposed in said second slot, said second sleeve in a first position blocking a fluid flow in said lower output line and allowing a fluid flow in said upper output line, said second sleeve in a second position blocking a fluid flow in said upper output line and allowing a fluid flow in said lower output line; and a solenoid for displacing said first and second sleeves from said first and second positions concurrently.

* * * * *